United States Patent
O'Neill et al.

(10) Patent No.: US 11,054,637 B2
(45) Date of Patent: Jul. 6, 2021

(54) RGB WAVEFRONT SENSOR FOR TURBULENCE MITIGATION

(71) Applicant: Mission Support and Test Services, LLC, Las Vegas, NV (US)

(72) Inventors: Mary D. O'Neill, Santa Barbara, CA (US); David Terry, Santa Barbara, CA (US)

(73) Assignee: Mission Support and Test Services, LLC, North Las Vegas, NV (US)

( * ) Notice: Subject to any disclaimer, the term of this patent is extended or adjusted under 35 U.S.C. 154(b) by 0 days.

(21) Appl. No.: 16/231,023

(22) Filed: Dec. 21, 2018

(65) Prior Publication Data

US 2019/0212552 A1 Jul. 11, 2019

Related U.S. Application Data

(63) Continuation-in-part of application No. 15/201,306, filed on Jul. 1, 2016, now Pat. No. 10,389,940.

(Continued)

(51) Int. Cl.
*G02B 27/00* (2006.01)
*H04N 9/04* (2006.01)
(Continued)

(52) U.S. Cl.
CPC ............ *G02B 27/0068* (2013.01); *G01J 3/46* (2013.01); *G01J 3/51* (2013.01); *G01J 9/00* (2013.01);
(Continued)

(58) Field of Classification Search
CPC .. G02B 27/0068; G02B 27/017; G02B 26/06; G02B 2027/014; G02B 2027/011;
(Continued)

(56) References Cited

U.S. PATENT DOCUMENTS

| | | | |
|---|---|---|---|
| 2014/0125860 A1* | 5/2014 | Tofsted | .................. H04N 5/238 348/349 |
| 2016/0005154 A1* | 1/2016 | Meyers | ..................... G06T 7/11 382/274 |

OTHER PUBLICATIONS

Beckers, J.M., "Adaptive optics for astronomy: Principles, performance, and applications," Ann. Rev. Astron. Astrophys. 31 (1993) 13-62.

(Continued)

*Primary Examiner* — Tat C Chio
(74) *Attorney, Agent, or Firm* — Weide & Miller, Ltd.

(57) ABSTRACT

A compact adaptive optics system for long-range horizontal paths imaging that improves degraded images. The system uses a filter that corresponds to the three colors in a typical color detector element, one or more optic elements, a deformable mirror, and a detector. Focus errors, due to turbulence, in the image recorded by the detector element show up as image shifts in the three distinct color images. The shifts and statistics of these shifts between these simultaneous images are used to create control signals for the deformable mirror resulting in a compact adaptive optic system for horizontal paths without need for a point source located at the distance scene being imaged. Analysis of the relative pixel shifts in various regions of the image provides third order statistics revealing tip/tilt and additional Zernikes modes that are used to control a deformable mirror without the need for a guide star/point-source.

21 Claims, 8 Drawing Sheets

Related U.S. Application Data

(60) Provisional application No. 62/609,204, filed on Dec. 21, 2017, provisional application No. 62/188,412, filed on Jul. 2, 2015.

(51) Int. Cl.

| | | |
|---|---|---|
| *H04N 5/357* | (2011.01) | |
| *G02B 26/06* | (2006.01) | |
| *G01J 9/00* | (2006.01) | |
| *G06T 7/00* | (2017.01) | |
| *G01J 3/51* | (2006.01) | |
| *G01J 3/46* | (2006.01) | |
| *G02B 27/01* | (2006.01) | |

(52) U.S. Cl.
CPC .......... *G02B 26/06* (2013.01); *G02B 27/017* (2013.01); *G06T 7/0002* (2013.01); *H04N 5/357* (2013.01); *H04N 9/0455* (2018.08); *G01J 2009/002* (2013.01); *G02B 2027/011* (2013.01); *G02B 2027/014* (2013.01); *G02B 2027/0112* (2013.01); *G02B 2027/0138* (2013.01); *G06T 2207/10016* (2013.01); *G06T 2207/10024* (2013.01); *G06T 2207/10032* (2013.01)

(58) Field of Classification Search
CPC ..... G02B 2027/0112; G02B 2027/0138; G01J 3/46; G01J 3/51; G01J 9/00; G01J 2009/002; G06T 7/0002; G06T 2207/10016; G06T 2207/10024; G06T 2207/10032; H04N 5/357; H04N 9/0455
See application file for complete search history.

(56) References Cited

OTHER PUBLICATIONS

Born, M., E. Wolf, Principles of Optics, Section 9.2, Pergamon, New York, 1965.
Carrano, C., "Bispectral speckle imaging algorithm performance of specific simulated scenarios," LLNLTR645877, Lawrence Livermore National Laboratory, Livermore, California, Nov. 2013.
Fried, D. L., "Optical heterodyne detection of an atmospherically distorted signal wavefront," Proc. IEEE 55 (1967) 57-77.
Fried, D. L., "Probability getting a lucky shortexposure image through turbulence," J. Opt. Soc. Am. 68 (1978) 1651-1658.
Hufnagel, R. E., "The probability of a lucky exposure," Tech. Memo. REH0155, Perkin-Elmer, Norwalk, Connecticut, Feb. 1989.
Kolmogorov, A. N., "The local structure of turbulence in incompressible viscous fluid for very large Reynolds number," Dokl. Akad. Nauk SSR 30, 4 (1941) 301-305.
Lukin, V. P., N. N. Botygina, O.N. Emaleev, P.A. Konyaev, "Wavefront sensors for adaptive optical systems," Meas. Sci. Rev. 10, 3 (2010) 102-107.
Martinez, P., J. Kolb, M. Sarazin, A. Tokovinin, "On the difference between seeing and image quality: When the turbulence outer scale enters the game," European Southern Observatory Messenger 141 (2010) 5-8.
Max, C., Lecture 3 of Astronomy 289C: Adaptive Optics and its Applications, University of California, Santa Cruz, Apr. 8, 2010.
Noll, R. J., "Zernike polynomials and atmospheric turbulence," J. Opt. Soc. Am. 66 (1976) 207-211.
O'Neill, M. D., D. Terry, A. Potter, I. McKenna, "Passive method to characterize atmospheric turbulence," in Site-Directed Research and Development, FY 2013, National Security Technologies, LLC, Las Vegas, Nevada, 2014, 125-135.
Rais, M., J.-M. Morel, C. Thiebaut, J.-M. Delvit, G. Facciolo, "Improving the accuracy of a Shack-Hartmann wavefront sensor on extended scenes," 6th International Workshop on New Computational Methods for Inverse Problems (NCMIP), May 2016, Cachan, France, https://hal-enpc.archivesouvertes. fr/hal-01344949/document, accessed Oct. 5, 2016.
Sidick E., J. J. Green, C. M. Ohara, D. C. Redding, "An adaptive cross-correlation algorithm for extended scene Shack-Hartmann wavefront sensing," in Adaptive Optics: Analysis and Methods/Computational Optical Sensing and Imaging/Information Photonics/Signal Recovery and Synthesis Topical Meetings on CD-ROM, OSA Technical Digest (CD) (Optical Society of America, 2007), paper JTuA7, http://www.meripet.com/Papers/JTuA7.pdf, accessed Oct. 5, 2016.
Sidick, E., "Extended scene Shack—Hartmann wavefront sensor algorithm: Minimization of scene content dependent shift estimation errors," Appl. Opt. 52 (2013) 6487-6496.
Tofsted, D. H., "Turbulence simulation: Outer scale effects on the refractive index spectrum," ARL-TR-548, Army Research Laboratory Technical Report, Nov. 2000, http://www.arl.army.mil/arlreports/2000/ARL-TR-548.pdf, accessed Apr. 6, 2015.
Tofsted, D., "Passive adaptive imaging through turbulence," Proc. SPIE 9833 (2016) 98330B.
O'Neill, M. D., D. Terry, "Portable COTS RGB wavefront sensor," MSS Passive Sensors, Gaithersburg, Maryland, 2016.
O'Neill, M. D., D. Terry, "RGB wavefront sensor for turbulence mitigation," in Site-Directed Research and Development, FY 2016, National Security Technologies, LLC, Las Vegas, Nevada, 2017, 09-117.
Poyneer, L. A., K. La Fortune, C. Chan, "Scene-based wave-front sensing for remote imaging," UCRL-JC-154654 Lawrence Livermore National Laboratory, Livermore, California, 2003.
Vdovin, G., O. Soloviev, M. Loktev, V. Patlan, "OKO Guide to Adaptive Optics," 4th edition, OKO Technologies, May 2013.
Hufnager, R.E., Measurement of Atmospheric Turbulence via Observations of Instantaneous Optical Blur Functions, Perkin-Elmer Corporation, Norwalk, Connecticut, USA, 1970, 11 pages.

\* cited by examiner

RGB WAVEFRONT SENSOR FOR TURBULENCE MITIGATION

1. PRIORITY CLAIM

This application claims priority to and the benefit of U.S. Provisional Application 62/609,204 titled RGB WAVEFRONT SENSOR FOR TURBULENCE MITIGATION and filed on Dec. 21, 2017.

2. GOVERNMENT STATEMENT

This invention was made with government support under Contract No. DE-NA0003624 and was awarded by the U.S. Department of Energy, National Nuclear Security Administration. The government has certain rights in the invention.

3. FIELD OF THE INVENTION

The invention relates to optic systems and in particular to a method and system for using an RGB wavefront sensor for turbulence mitigation.

4. RELATED ART

The major limitation on performance of optical remote sensing technologies is atmospheric turbulence-induced degradation, especially in horizontal ISR (intelligence, surveillance and reconnaissance) applications at long range. While algorithms exist for turbulence mitigation, under extreme turbulence, little or no high spatial frequency content remains and these algorithms will not work for image improvement.

To aid in understanding, the atmosphere has three major effects on a propagating wave: absorption, scattering, and refractive-index fluctuations (optical turbulence). Atmospheric turbulence-induced image degradation presents a significant problem in extended range surveillance and signal processing because, in many applications, these effects are more restrictive to viewing resolution than the diffraction limit.

Turbulence is strongest when there is a large temperature differential between the earth (ground) and the surrounding air. When the earth is warmed by the sun, energy is injected back into the air as wind mixes the buoyant warm bubble of air with the surrounding cooler air. The energy dissipates into the next layer; thus, cell size typical reduces from larger to smaller. The larger cells act as refractive elements, and the smaller cells act as diffractive elements. In general, the smallest and largest cells determine the inner ($l_0$) and outer ($L_0$) scales of turbulence.

Atmospheric effects linked to turbulence reduce the ability to make remote sensing measurements because these effects add spatial and spectral scintillation. Adaptive optics (AO) systems have been used in astronomy to correct for the wavefront distortion associated with atmospheric turbulence. Some Shack-Hartmann AO systems, project an image of the pupil onto a lenslet array, such that the image from each lenslet represents a different portion of the entrance aperture. Each lenslet images the scene onto a different portion of the detector that is dedicated to this wavefront sensor. In the absence of turbulence, the images of the coherent point source (star) are uniformly distributed based on the lenslet configuration, with turbulence the pixel shifts describe the wavefront errors. This allows accurate measurement of wavefront errors with a coherent source, namely a laser.

While AO works well for astronomical viewing, the same methods do not work well for complex imagery from long-range horizontal paths. For horizontal, long range imaging, methods to correct for turbulence are limited to systems using algorithms or to adaptive optics systems that use a guidestar such as a laser or other point source in the scene. With prior art systems, algorithms alone cannot correct for turbulence over long-range horizontal paths. Each of these methods all suffer from the same lack of high spatial frequency content characteristic of high turbulence.

Currently, no adequate compact solution exists for significant long-range horizontal path-induced degradation. Disclose herein is a method and apparatus to overcome the drawbacks in the prior art.

SUMMARY

Disclosed is a compact adaptive optics system for long-range horizontal paths that improves severely degraded images that includes an RGB wavefront sensor that allows the measurement of the phase of the wavefront errors without the need for a guidestar (laser or other coherent source). In one embodiment, the disclosed system uses a Hartmann mask (filter) composed of three distinct colors that correspond to the three colors in a typical color detector Bayer mask. Focus errors associated with turbulence show up as image shifts in the three distinct color images. Exploiting the shifts and using the statistics of turbulence to overcome the lack of spatial frequency content to enhance these shifts between these simultaneous images creates control signals provided to a deformable optic resulting in a compact adaptive optic system for horizontal paths without need for a point source located at the distance scene being imaged. A deformable optic is any reflective or transmissive optical element that can be deformed to correct for optical aberrations. Thus, the RGB wavefront sensor measures in-situ turbulence-induced wavefront errors without a point source in a complex scene sends commands a deformable optic to complete the RGB wavefront system.

This compact method uses an optical element (telescope or lens system) fitted with three apertures tuned to the relative spectral response of the detector filters. A detector can be of any suitable technology for the wavelength region of interest. This includes Active-pixel sensors (APS) imagers such as CMOS and CCD technologies. A typical visible wavelength detector will have a Bayer mask which has filters for red, green and blue wavelengths. A custom mask could be four or more distinct wavelengths and the four or more filters could thus be placed in front of the optical element. The detector mask and filters must spectrally match to allow complete separation of the color plane images. Analysis of the relative pixel shifts in various regions of the image provides third order statistics revealing tip/tilt and additional Zernikes modes that are used to control a deformable optic.

To enable these methods, one proposed system combines a color detector element with a compact 90 mm Maksutov-Cassegrain telescope to create a portable red/green/blue wavefront sensor. The 90 mm aperture is covered with an aluminum plate holding three separate narrowband color filters. These filters, specifically matched to the relative spectral response of the commercial off the shelf (COTS) APS imager filter mask, provide nearly complete separation of the three color planes.

This device enables portable imaging through atmospheric turbulence and analysis thereof, where relative motion of the three-color video provides real-time wavefront information on the second-order statistics of Kolmogorov turbulence. Not only can dwell-averaged wavefront tip and tilt as a function of time be extracted, but also, using spectral filtering algorithm, the system is able to fit higher-order modes to the imaged wavefront statistics. Also contemplated and disclosed is a combination of this sensor with a deformable optic and processing elements to complete the AO system for long-range horizontal paths. This is but one possible selection and arrangement of elements and it is understood that the method and apparatus disclosed herein may be enabled with different components.

In one configuration, the RGB wavefront sensor is based on the Shack-Hartmann interferometry with processing methods exploiting third order statistics similar to the bispectrum method. This sensor matches the three (or more) colors corresponding to different locations of the entrance aperture with the detector filter colors associated with the coupled sensor. This assures that the three parts of the aperture are imaged separately allowing the distinct image shifts associated with each part of the aperture to be exploited. When the image is in-focus, the three colors align, but when the telescope or lens is out of focus, the three colors separate. The direction of focus is related to whether the rays meet in front or behind the image plane thus allowing additional information. Using the focus information, and lack thereof, before and after the focus plane, the amount of pixel shift can be characterized.

The system and algorithms extract turbulence strength using mean relative image motion. By exploiting the algorithms for measuring the strength turbulence the system can work in block areas. The systems and algorithms for measuring the strength turbulence is disclosed in U.S. Pending patent application Ser. No. 15/201,306, filed on Jul. 1, 2016 and entitled PASSIVE METHOD TO MEASURE STRENGTH OF TURBULENCE, which is incorporated in its entirety by reference herein. This includes a method to enhance turbulence, thus allowing measurement of focus errors even with little high spatial frequency content in the scene as is the case in high turbulence.

In operation, after illumination from the scene goes through the turbulent atmosphere the image (light), the parallel light rays (ray bundle) enter the RGB filters. The first optical element reduces the ray bundle size to match the size of the deformable optic. In one embodiment, the deformable optic is a deformable mirror. The turbulence causes the phase of the rays to be perturbed. The second set of optical elements focus this ray bundle onto the detector image plane. The original image, with the phase errors associated with turbulence, is then presented to the image plane of the color detector element. Unlike typical AO systems, this closed loop system uses the same detector for wavefront sensing and for image data capture. As the video frames are collected, the mirror commands are generated via the pixel shifts and third order statistics correcting for the turbulent atmosphere. This compact adaptive optic system can be coupled with additional image correction algorithms for further improvement of imagery. This process is described in greater detail below.

In one embodiment, an adaptive optic system for horizontal path imaging is provided which receives an optic signal representing an image reflected from a remote scene. The system includes one or more filters configured to filter, based on wavelength, the optic signal to create one or more filtered optic signals. One or more optical element configured to magnify the one or more filtered optic signals to create one or more magnified optic signals. Also part of this embodiment is a deformable optic configured to receive and modify the one or more magnified optic signals responsive to adaptive optic control signals to create one or more adaptively adjusted optic signals. In response to the adjustment of the deformable optic, the image formed on the detector will improve focus. As turbulence changes, the image will degrade but concurrently delta pixel shifts will be converted to new control signals to complete this closed loop adaptive optic system.

Also part of this embodiment is a processing system configured to receive the one or more digital image data sets, process the one or more digital image data sets to create turbulence data, process the one or more digital image data sets using the turbulence data to generate the adaptive optic control signals, and provide the adaptive optic control signals to the deformable optic element, such that the deformable optic element, based on the adaptive optic control signals, removes distortion in the optic signal representing the image. The processing system then generates and displays an image of the remote scene on a display. This image is the same image used for correction. The displayed image is improved as compared to the optic signal representing an image reflected from a remote scene that was received by the optic system.

In one embodiment, the optic signal is distorted due to turbulence located between the remote scene and the optic system. The one or more filters may comprise a red filter, a green filter and a blue filter. It is contemplated that the step of modifying the one or more magnified optic signals responsive to adaptive optic control signals comprises adjusting the position of segments of the deformable optic to adjust the phase of the one or more magnified optic signals.

As is understood, the detector may comprise a Bayer mask and an APS imager. It may also be any custom filter set on the appropriate detector elements for the wavelengths of interest. In one embodiment, the one or more digital image data sets comprises a red channel data set, a green channel data set, and a blue channel data set.

Also disclosed is a method for compensating for distortion in a received image caused by turbulence. In one embodiment, this method includes receiving an image of a remote scene with an optic system. The image is distorted by turbulence as the image travels from the remote scene to the optic system. Then, filtering the received image to generate a red channel image, a green channel image, and a blue channel image. A deformable optic element receives and reflects or transmits the red channel image, a green channel image, and a blue channel image.

Responsive to adaptive optic control signals which control positions of reflective surfaces of one or more segments of the deformable optic element, reflecting the red channel image, a green channel image, and a blue channel image to a detector element, such that the reflected red channel image, reflected green channel image, and reflected blue channel image is modified to reduce distortion introduced by the turbulence. Then, converting the reflected red channel image, the reflected green channel image, and the reflected blue channel image to red channel data, a green channel data, and a blue channel data with the detector element. This method next presents the red channel data, a green channel data, and a blue channel data to a processor. The processor performs calculations on the red channel data, a green channel data, and a blue channel data to generate turbulence data. The turbulence data characterizes the turbulence which distorted the image of a remote scene received by the optic system.

Next, processing the red channel data, a green channel data, and a blue channel data and the turbulence data to generate the adaptive optic control signals. The adaptive optic control signals are provided to the deformable optic element. The systems also generates and displays a turbulence corrected image on a display.

For this system, the remote scene is typically along a horizontal path. In one embodiment the one or more filters comprise a red filter, a green filter and a blue filter. The deformable optic element comprises one or more deformable mirrors.

The system and its operation may further comprise magnifying the red channel image, a green channel image, and a blue channel image prior to receiving and reflecting the red channel image, a green channel image, and a blue channel image with the deformable optic element. The detector element may comprise a Bayer mask and an APS imager. In one configuration, as part of the processing, a variance image data is created. This variance image enhances turbulence thus allowing more accurate measurement of phase errors even in the absence of high spatial frequency content.

Also disclosed is an optic system for horizontal path imaging to compensate for turbulence comprising one or more filters configured to receive and filter an optic signal to create one or more filtered optic signals. After filtering, a deformable optic element modifies the one or more filtered signals to counter the effects of turbulence on the image to create one or more modified filtered signals. Magnification of the signal with a telescope element may occur after or before filtering. A detector receives and converts the one or more modified filtered signals to image data.

A processing system is provided and is configured to process the image data to create turbulence data, process the image data and the turbulence data to generate the adaptive optic control signals, and then provide the adaptive optic control signals to the deformable optic element, such that the modification of the one or more filtered signals by the deformable optic element is based on the adaptive optic control signals. The system may also generate and display an image of the remote scene on a display for viewing by a user.

The optic signal may be distorted due to turbulence located between the remote scene and the optic system. The one or more filters may comprise a red filter, a green filter and a blue filter, or other colors which are coordinated with the APS imager and the Bayer mask of the APS imager. The one or more digital image data sets may include a red channel data set, a green channel data set, and a blue channel data set. It is contemplated that the processing of the image data includes measurement of the phase of the wavefront errors without the need for a guide star.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
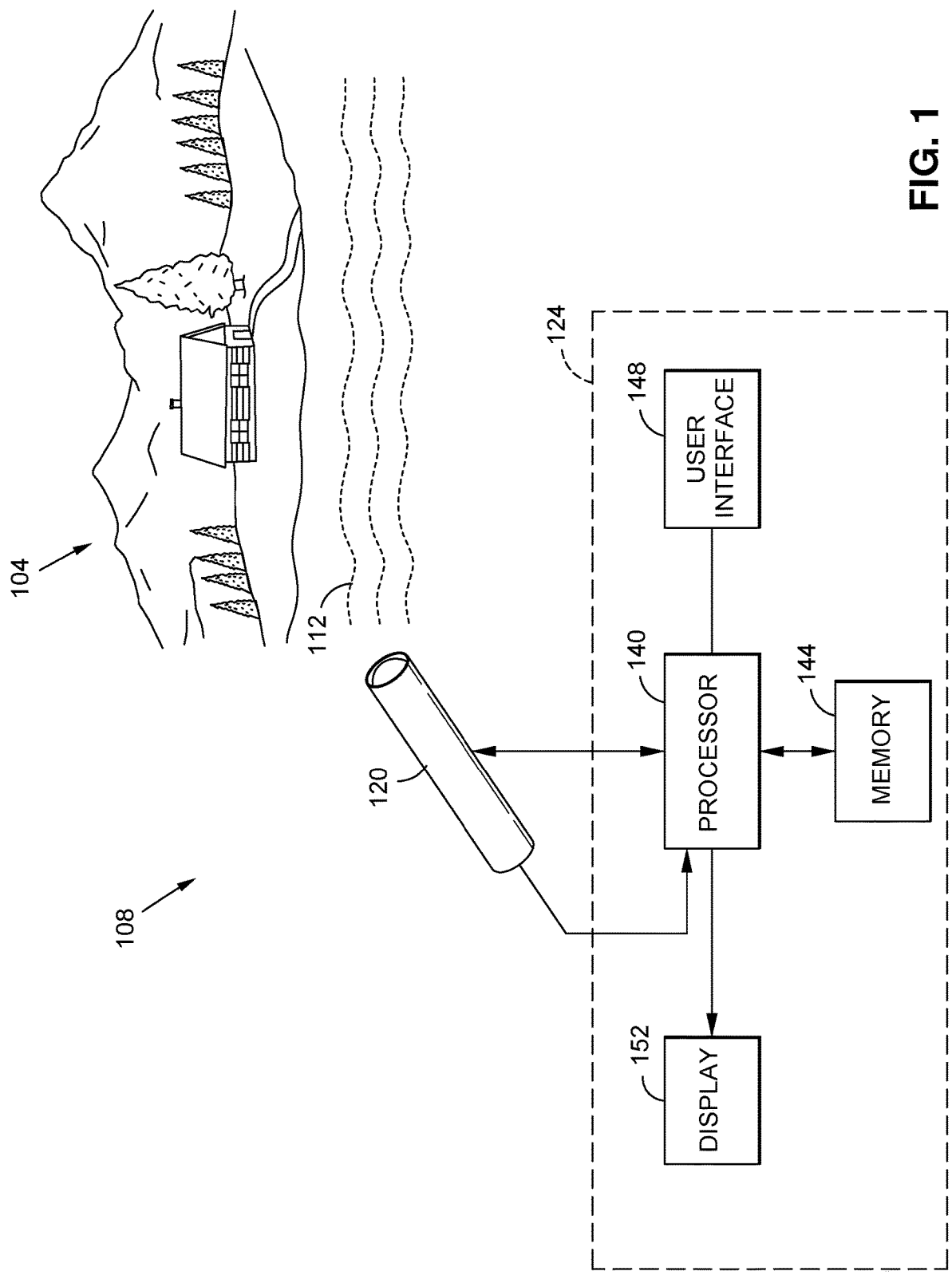
FIG. 1 is a block diagram of the innovation in an exemplary environment of use.

FIG. 1 is a block diagram of the innovation in an exemplary environment of use. This is but one possible example environment of use and system. It is contemplated that other embodiments and environments of use are possible. As shown, a distant scene 104 is presented for observation over a generally horizontal path. The reason for observation may vary by application but may range from the following applications: forestry, police, search and rescue, military, surveillance, commercial monitoring, farming, ranching, marine environments, or any other use or environment needing long range imaging of a distant scene.

Proposed and disclosed is a compact AO system for long-range horizontal paths that improves severely degraded images. Located remote from the scene 104 of interest is an imaging system 108. Between the imaging system 108 and the remote scene 104 is a distance over which turbulence 112 is present. As is understood in the art, turbulence 112 disrupts the light rays reflected from the scene 104 thereby distorting the image of the scene presented to the imaging system 108. This distortion is caused by phase errors in the incoming wavefront.

In this example embodiment, the imaging system includes sensor elements 120 (discussed below in detail) and processing and display elements 124. The sensor elements 120 and processing and display elements 124 receive and process the image information to mitigate the effects of the turbulence 112 thus providing an image that is clearer than that achievable by prior art designs. The sensor elements 120 receive the image of the scene 104 and subject to the optical processing described herein, generates and presents digital image data representing scene to the processing and display elements 124. The processing and display elements 124 process the digital image data to generate control signal for the sensor elements 120 and to further improve image quality.

The processing and display elements 124 comprise a processor 140 that is in communication with the sensor elements 120. The processor 140 communicates with a memory 144 configured to store data and machine executable instructions, which may be executed by the processor. A user interface 148 is provided to accept input from a user for control of one or more aspects of the imaging system 108. A video or image display 152 is in communication with the processor to present the resulting image to a user. Additional components may be part of the processing and display elements 124. In one embodiment, the processing and display elements 124 may comprise a tablet, mobile communication device, laptop, computer, mobile smart phone device, heads up or headset display, vehicle computing elements and display, or any other processing system.

The phase map derived from algorithms executed on the processor generates the commands and control signals to a deformable mirror that is part of the sensor elements 120 that corrects for the wavefront distortion associated with turbulence. The algorithms for detecting the shifts are fast enough to change the mirror as the turbulence changes.

Figure 2:
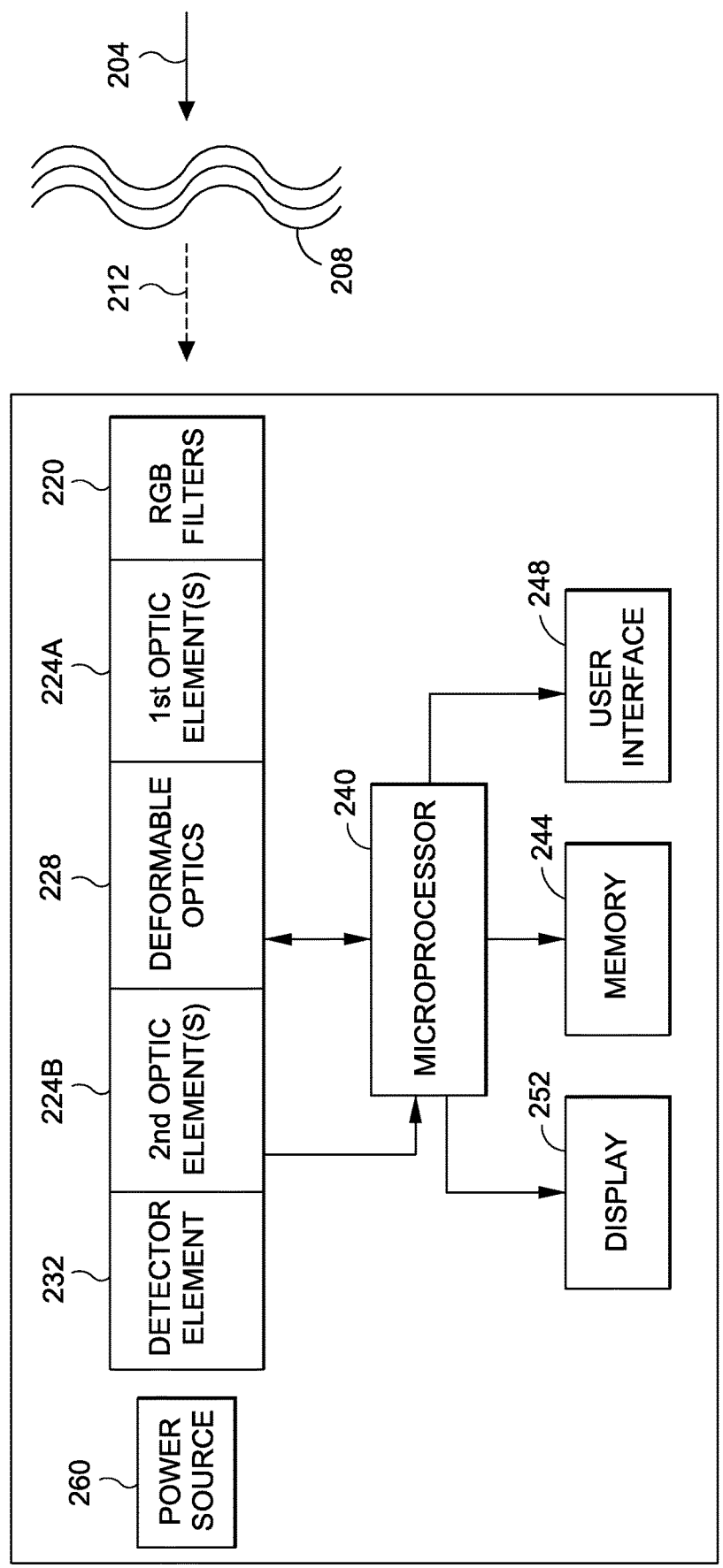
FIG. 2 is a block diagram of one example embodiment of the invention.

FIG. 2 is a block diagram of one example embodiment of the invention. This is but one possible embodiment and arrangement of elements. Other arrangements are contemplated and are not outside of the scope of the claims which follow. As discussed above in connection with FIG. 1, illumination (such as for example solar illumination) reflects off the scene of interest (not shown in FIG. 2) to create in incoming image 204. Turbulence 208 distorts the image prior to the image reaching the system, resulting in a distorted image. The distorted image enters an RGB filter 220 which has three or more sub-apertures. The exemplar RGB filter 220 is shown and described in greater detail in FIG. 3. The RGB filter 220 filters the incoming light rays (which represent the scene) thereby passing only wavelengths of light which correspond to the filter wavelength (color). In this embodiment there is a red filter which pass wavelengths in the red color spectrum, a blue filter which pass wavelengths in the blue color spectrum, and a green filter which pass wavelengths in the green color spectrum. In other embodiments, other colors (wavelengths may be passed) such that the pass bands of the files are coordinated with the mask of the detector element and the detector element outputs.

Figure 3:
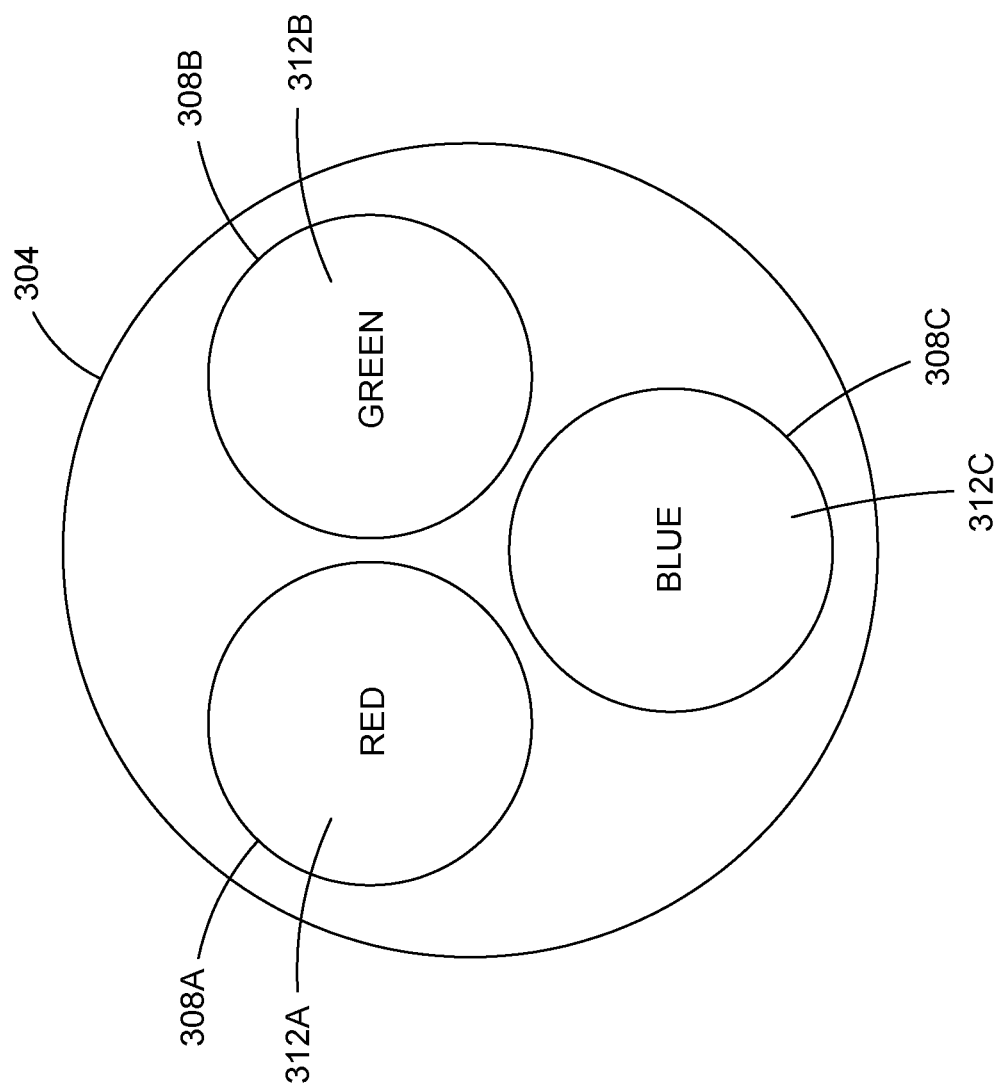
FIG. 3 is an exemplary RGB filter element.

FIG. 3 is an exemplary RGB filter. The perspective shown in FIG. 3 of the filter is planer, looking directly into the filter. An opaque support structure 304, such as aluminum, plastic, or any other material, is provided to support the filter lenses 308. In this configuration, the support structure 304 has a diameter that matches the other optics elements but in other embodiments it may be larger or smaller. The support structure 304 may be referred to as a phase plate. The support structure 304 has three apertures 308A, 308B, 308C. Aligned with and secured to each aperture is a filter, namely a red filter 312A, a green filter 312B, and a blue filter 312C. Each filter passes only light rays of a particular wavelength. The filter may be narrow-band filter specifically matched to the spectral response of the sensors Bayer Mask. This provides nearly complete separation of the three color images. It should be noted that the filter assembly reduces the apertures and thus increases the f/# of the system but through filter optimization, post processing, and detector element control, the reduced aperture size is mitigated.

Returning to FIG. 2, the light that pass through the RGB filter 220 is presented to optics, in this embodiment a first optic element(s) 224A. The first optic element(s) 224A may be any type telescopic or lens device configured to magnify or present the image or ray bundle representing the distant scene. In one embodiment, a Meade EXT-90 Maksutov-Cassegrain telescope was selected but in other embodiment other optic elements may be selected or design. The magnification may be fixed or variable depending on the application. It is contemplated that this system may be configured for use with or retrofit for existing optic system. It is understood that the deformable mirror will be inserted in the optic element at an exit pupil or other suitable location to collect the compressed ray bundle.

The first optic element 224A reduces the ray bundle size such that the full ray bundle presents at the deformable mirror 228. The deformable mirror 228 comprises a mirror having a deformable reflective surface which, based on a control signal, dynamically adjusts the position of the reflective surface, typically at numerous locations on the deformable mirror. In one embodiment, a plurality of pistons or other type actuator, control the position of the reflective surface of the deformable mirror 228.

Figure 4:
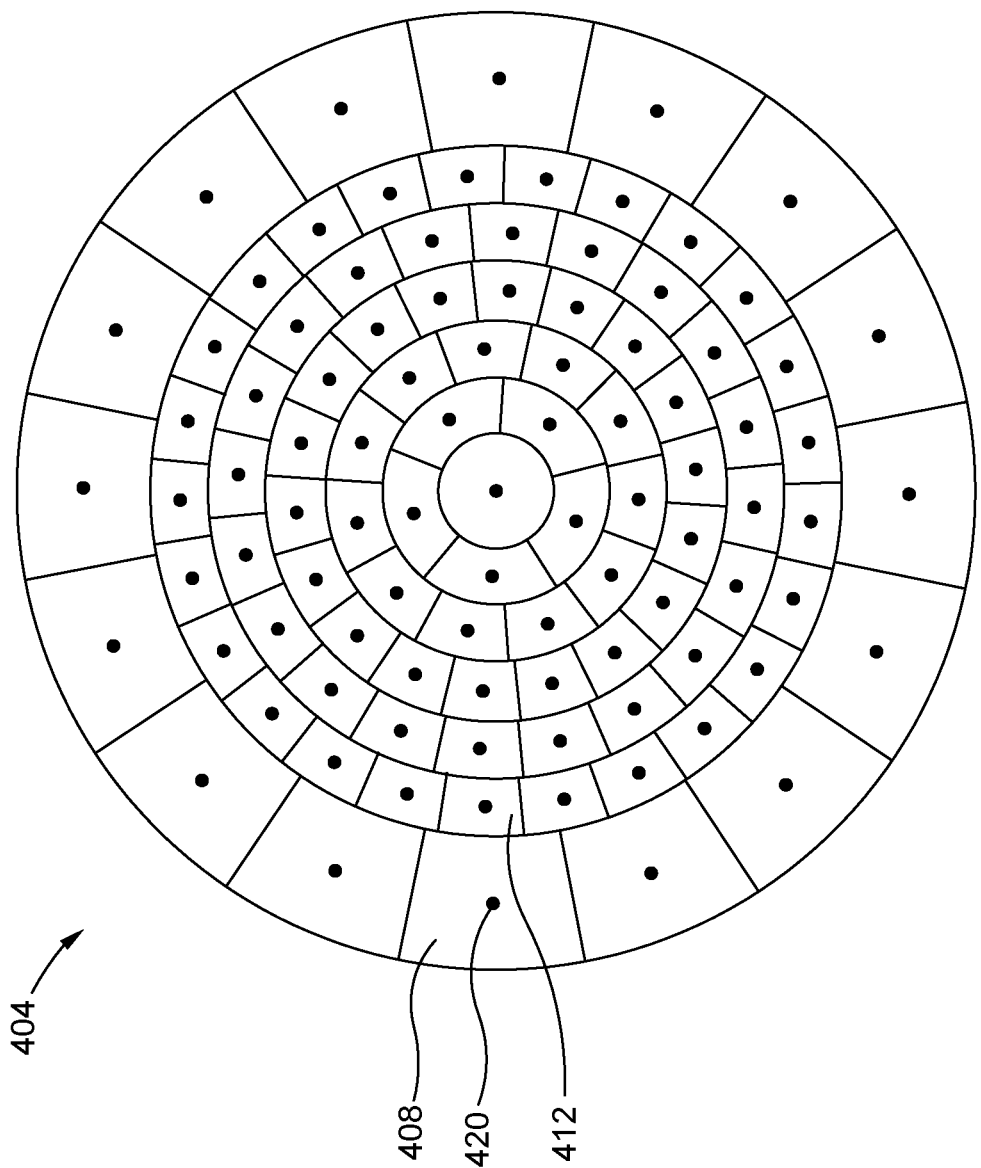
FIG. 4 is an exemplary sector layout of a deformable mirror with associated piston locations.

The reflective surface may be divided into sectors as shown in FIG. 4 or in a typical grid pattern as is the case for spatial light modulators (SLMs) or liquid crystals. The sectors include sector 408 and sector 412 as well as numerous other sectors dividing the mirror surface. Additional sector increase control complexity while fewer sector reduce the ability of the mirror to compensate for phase shift. Associated with each sector is a piston or actuator location 420. It is contemplated that the sectors may be divided or segmented in any manner and one or more piston may be associated with each sector.

In operation, the deformable mirror corrects for the phase of errors in the ray bundle introduced by turbulence based on the control signals from the microprocessor. The second optic element 224B then focuses the rays onto the image plane of the detector element 232. In general, the turbulence introduced phase distortion in the incoming signal and the deformable mirror 228 is dynamically adjusted to compensate for this phase shift to thereby increase image quality and clarity. The processing that occurs to calculate turbulence and the deformable mirror control signals is described in detail below.

Returning to FIG. 2, the phase corrected image from the deformable optic element (such as a mirror) 228 is presented to a detector element 232 after being focused by the second optic element 224B. The detector element 232 may be any type of detector element configured to capture an image such as a detector for capturing and recording video or images. In one embodiment, the detector element is a Point Grey Grasshopper camera discussed and available at www.ptgrey.com. In another embodiment, a detector element with associated filter mask receives the different images, one from each filter, each of which is in a different wavelength. The resulting digital image data represents three (or more) images, each limited generally to data representing a particular wavelength.

When the optics are focused, and no turbulence is present, the three color images align perfectly on the detector element 232 resulting in a clear imager. Because individual light rays go through different points of a plane before or behind focus, any defocus shows up as a pixel shift, which through calibration and computation are converted to deformable mirror control signals. Thus, when in the image is in focus, the pixels are oriented to the same point on the image plane, but when out of focus, the shifted pixels indicate degrees of tip or tilt or other Zernike modes (phase shift).

The output of the detector element 232 is presented to a microprocessor 240. In one embodiment, three sets of image data are presented to the microprocessor 240 from the detector element 232. The three sets if image data are the red image data (formed from the light passing through the red filter and striking the detector element), the green image data (formed from the light passing through the green filter and striking the detector element), and the blue image data (formed from the light passing through the blue filter and striking the detector element). Each data set is presented to the processor and may be arranged in stacks of sequential image frames for subsequent processing as discussed below. In one embodiment, a commercially available mobile Samsung-based 8-CPU single-board computer (SBC) is utilized that drives the USB3 camera, runs Linux, operates on battery power, and offers WiFi hot spot connectivity. For example, an ODRIOD may be utilized that uses the Samsung Exynos-5422 processor, which is a system-on-chip

[SoC] common to Samsung Galaxy tablets. This commercially available device is configured to perform all the computing, including the variance image, pixel shifts, and mirror control. When combined with a deformable mirror and telescope the resulting system forms an RGB wavefront sensor that is a portable, real-time adaptive optic system for long range horizontal paths.

Figure 8:
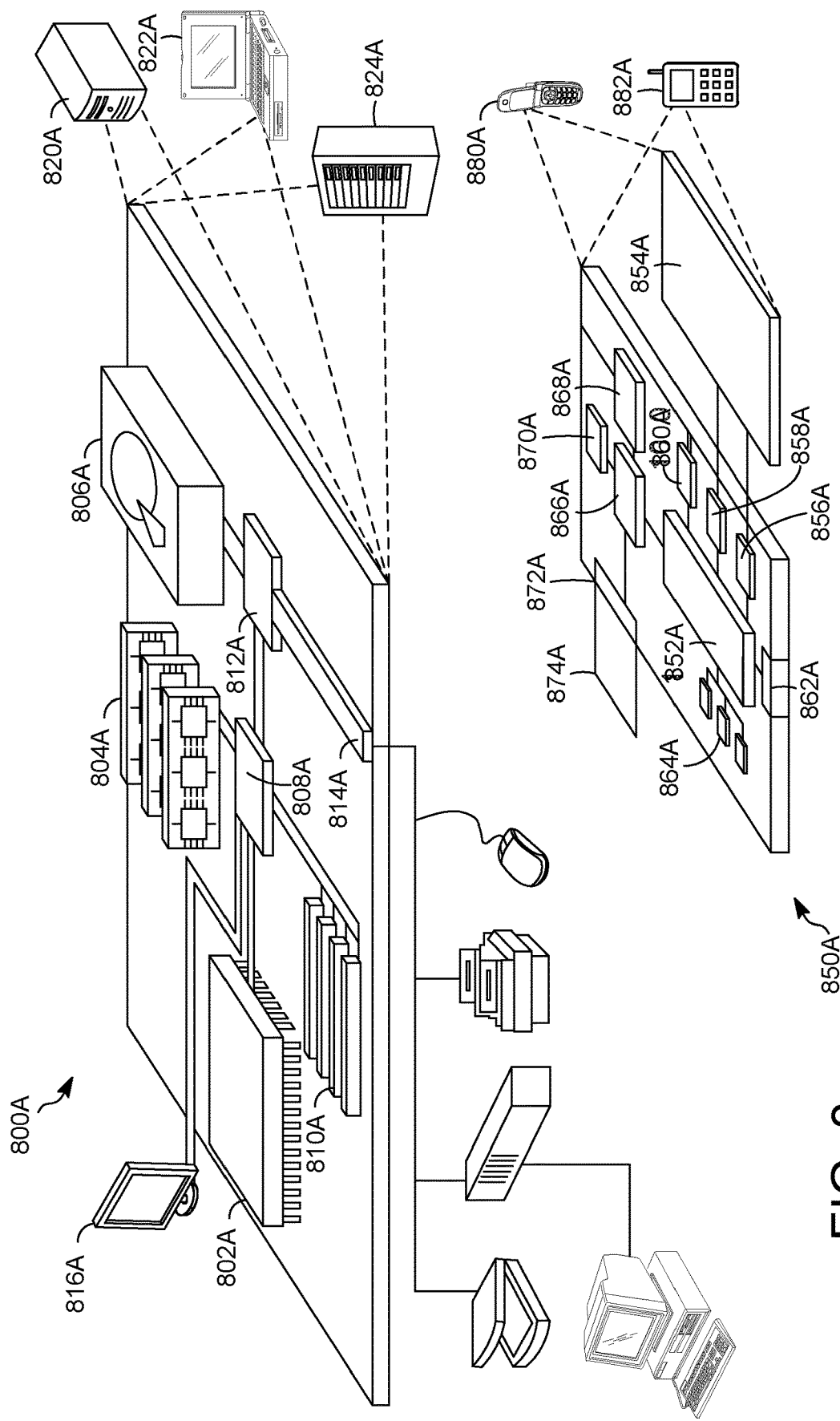
FIG. 8 is an exemplary computing system having a microprocessor.

Also associated with the microprocessor is a memory 244 configured to store machine readable and executable code. Any type memory may be used including volatile and non-volatile memory. A user interface 248 is also presented to providing input from the user to control or activate the system. Any type user interface 248 is contemplated. An electronic display 252 is provided to present the image to the user. A power source 260, such as wire line power, solar or a battery is provided to power any of the devices requiring electrical energy. FIG. 8 presents an exemplary processing system, having a microprocessor.

Figure 5:
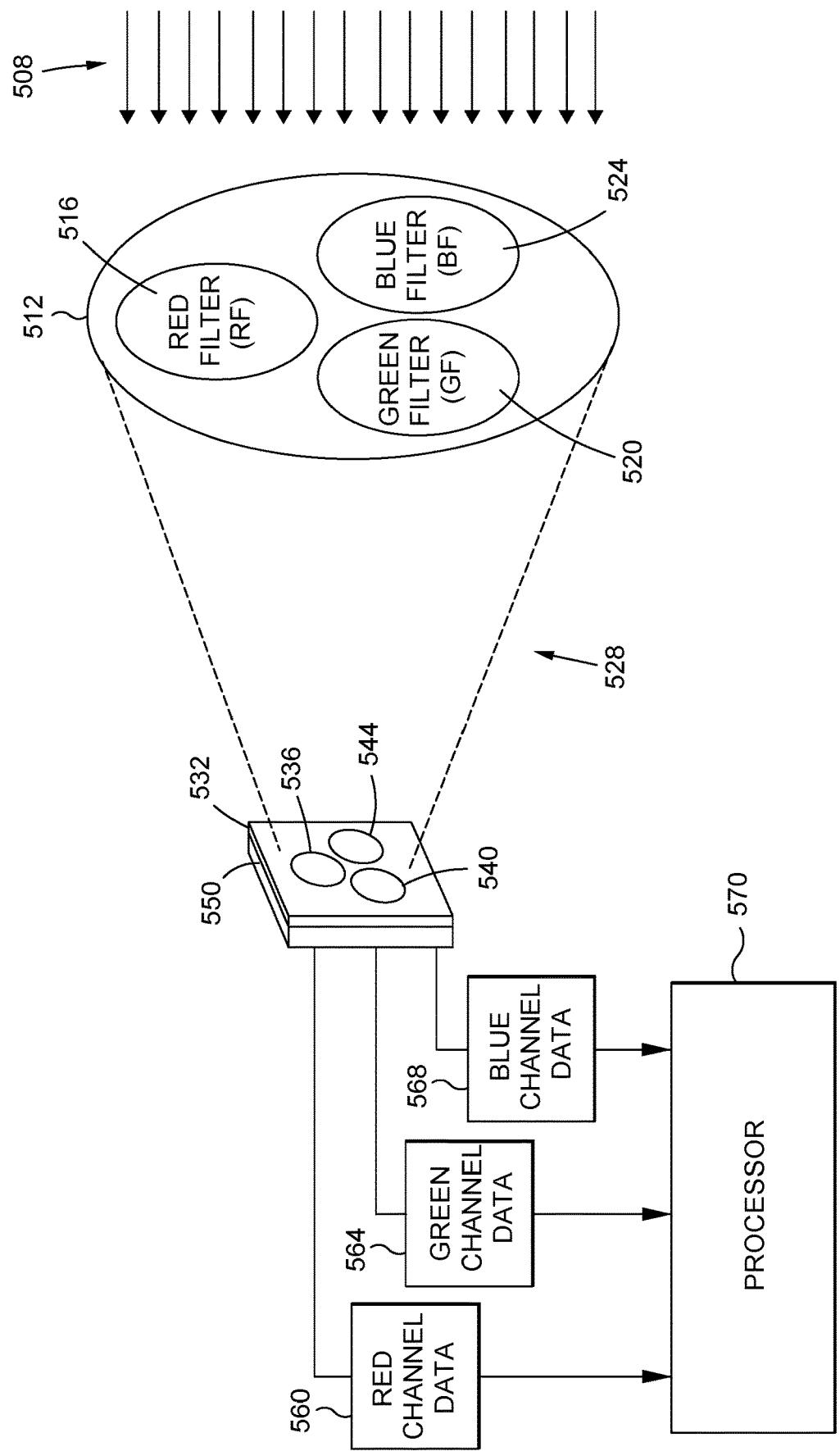
FIG. 5 illustrates an exemplary path for each color channel in a three filter system.

FIG. 5 illustrates an exemplary path for each color channel in a three filter system. This is one possible color channel path and in other embodiments other arrangements are possible. In this example embodiment, the incoming image 508 is presented to the filter assembly 512. The filter assembly houses the red filter 516, green filter 520, and the blue filter 524. The image elements pass through the filters 516, 520, 524 and are projected 528 to the Bayer mask 532 and detector element 550. Not shown in this embodiment is the telescopic optic element and the deformable mirror which are located between the filter assembly 512 and the Bayer mask 532.

The red filtered image 536 (consisting of red wavelength image components), green filtered image 540 (consisting of green wavelength image components), and the blue filtered image 544 (consisting of blue wavelength image components) are projected onto the Bayer mask 532 associated with the detector element 550. The Bayer mask 532 is an additional filter that is located before the detector element 550 to pass only certain wavelengths to certain detector element sensors dedicated to the corresponding wavelengths. The detector element 550 capture the signals presented to generate and output red channel data 560, green channel data 564, and blue channel data 568 which is presented to a processor 570. Each channel's data may be sequential frames of data, which may be arranged and processed in stacks which may comprise groups of frames of data from a particular color channel. As discussed above, the processor 570 processes the data from the detector element 550 to generate deformable mirror control signals and the image to be displayed, stored in memory, or both.

Figure 6:
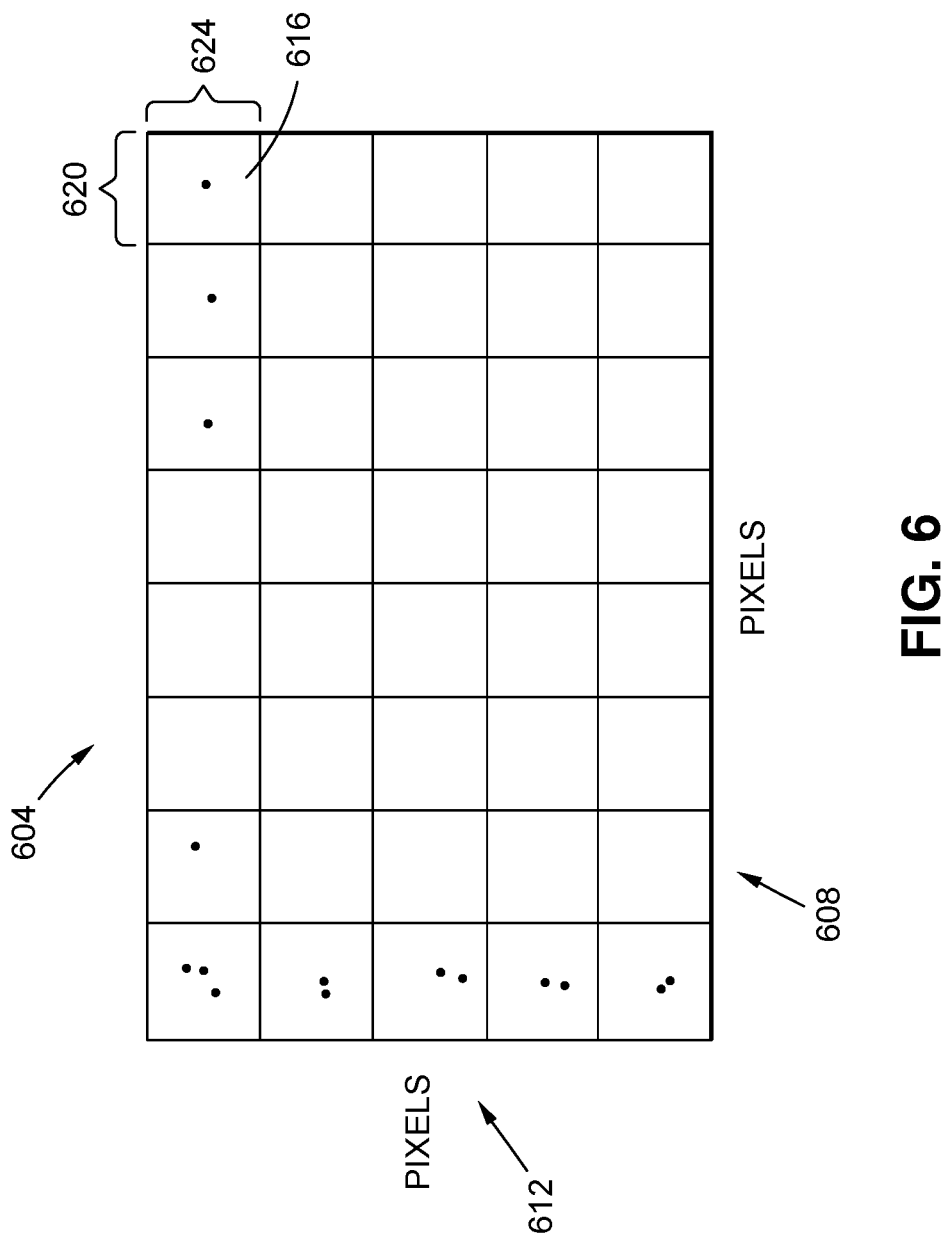
FIG. 6 is an exemplary grid pattern that divides the image data into grid portions.

FIG. 6 is an exemplary grid pattern 604 that divides the image data into grid blocks. Along the horizontal axis 608 there are eight grid blocks, each consisting of 64 pixels in the horizontal direction 620 of each grid block. Along the vertical axis 612 there are five grid blocks, each consisting of 64 pixels in the vertical direction 624 of the grid block 620. The image data for each color (wavelength) is separated or processed based on grid block. In this example embodiment, there are forty total blocks established for calibration and each block 616 is 64 by 64 pixels in size in the raw color planes. The grid size and number of pixels in each grid element can differ depending on the detector element and deformable mirror configurations. It is contemplated that the turbulence may not be constant across the entire image. By separating or processing the image based on grid blocks (position), a more accurate characterization of the turbulence may be made by correlating pixel shifts in each grid region to deformable mirror voltage commands.

Figure 7:
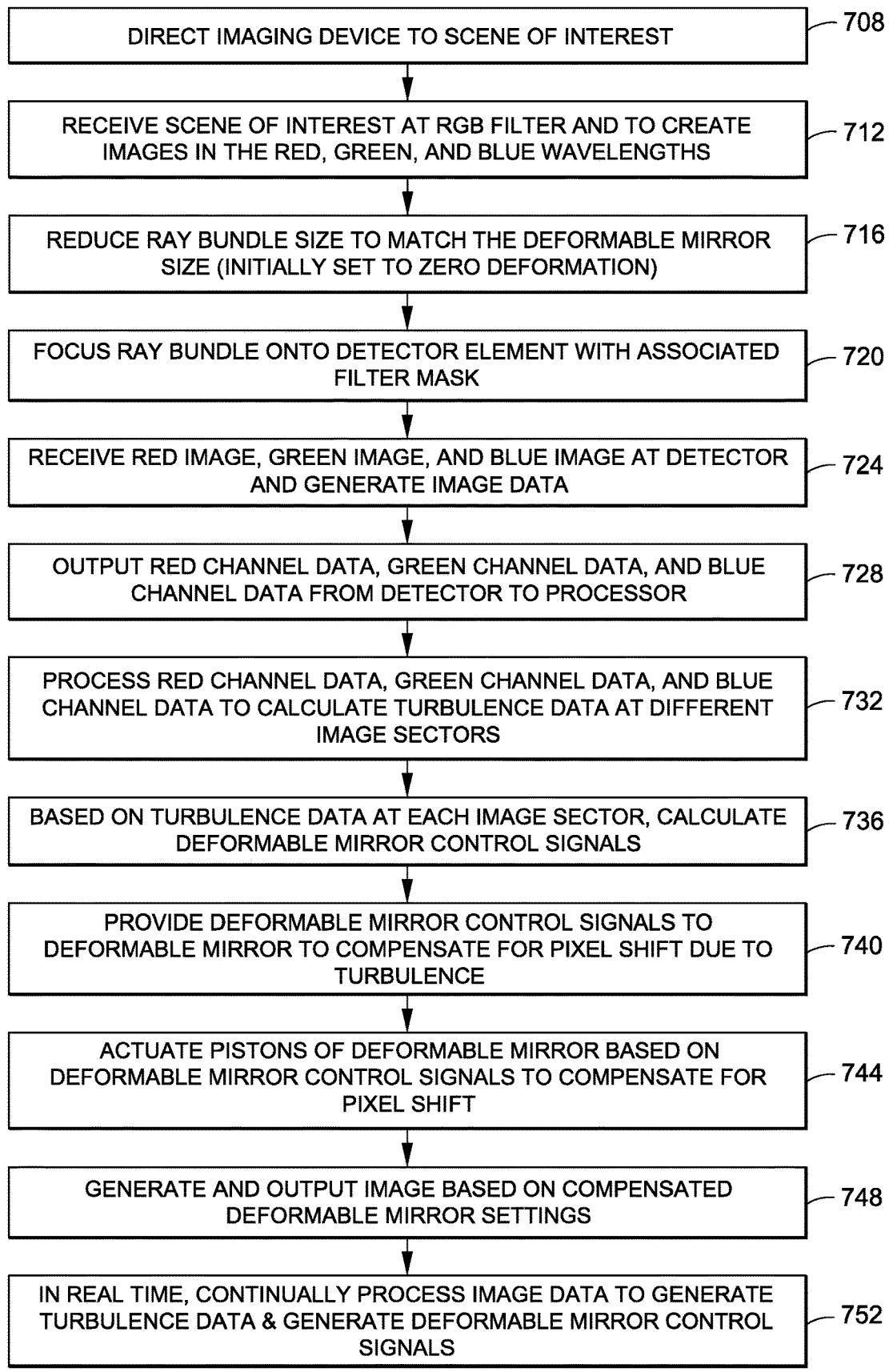
FIG. 7 is an operational flow diagram of an example method of operation.

In operation, at start up and when the telescope is initially focused and when no turbulence is present, the three images align perfectly. Because individual light rays go through different points of a plane before or behind focus, any defocus shows up as a pixel shift. When in focus, the pixels are oriented to the same point on the image plane, but when out of focus, the shifted pixels indicate degrees of focus error. FIG. 7 is an operational flow diagram of an example method of operation. This is but one possible method of operation and it is contemplated that other methods of operation are possible which do not depart from the scope of the claims. At a step 708, a lens of an imaging device is directed toward or pointed at a scene of interest that is remote and along a general horizontal path (non-astronomical). This allows the imaging device to capture the light rays from the scene. Next, at a step 712, the RGB filter receives and filters the light rays from the scene thereby establishing or creating the image in the red, green, and blue wavelengths (colors).

At a step 716, one or more optical elements reduce the size of the ray bundle to match the size of a deformable mirror or to be suitable for processing by the deformable mirror. At start up, the deformable mirror is inactive and thus set to zero deformation based on the start up control signals it receives. Over time the control signals vary to adjust the actuators of the deformable mirror. From the deformable mirror, one or more optical elements focuses the rays on an imaging element (detector) creating an image. The image is transmitted through a filter mask onto an imaging element (detector), such as an APS imager. This occurs at step 720. In some embodiments the filter mask may be a Bayer mask. At a step 724, the APS imager generates data representing the images. In this embodiment, due to the use of the three filters (RGB), three different data sets are captured, one for each of the three filters. One data set represents the red channel, one data set represents the green channel, and one data set represents the blue data set. In other embodiment, different color channels may be established or a greater or fewer number of color channels may be adopted. APS imager color channels and Bayer masks associated with APS imager are generally understood in the art and thus, are not described in great detail here. Three distinct images are created by the filters and three distinct images are presented to the APS imager, which converts the three images to digital data. The resulting data sets, grouped by color channel, may be arranged in stacks, such that the different images in the stack represent captured (sequential) image frames. Thus, for each color channel, stacks (frames) of data are captured and processed or captured and stored.

Next, at step 728 the detector element (APS imager) outputs the red channel data, the green channel data, and the blue channel data to the processor. This transfer may occur via a wired or wireless channel. At a step 732 the processor processes the data (red channel data, the green channel data, and the blue channel data) from the detector element to calculate deformable mirror commands for each sector based on the pixel shifts in each block to correct for the phase errors introduced by turbulence. The calculations utilized to formulate the turbulence data and deformable mirror control signal are discussed below.

At step 736, based on the calculated turbulence data, at each image block, the system calculates the deformable mirror control signals, for one or more segments of the deformable mirror based on the image block to deformable element calibration. Then, at a step 740, the deformable mirror control signals are provided to the deformable mirror to control the actuators or pistons of the deformable mirror.

At a step 744, the pistons are actuated based on the control signals to adjust the mirror surface(s) to compensate for the pixel shift. The changes to the mirror surface are such that the distortion in the image due to the turbulence is countered or compensated for thereby yielding an image with greatly improved clarity when presented to the APS. The deformable mirror compensates for phase error (pixel shift) thereby restoring the image to or close to its original content prior to the turbulence causing distortion.

Thereafter, at a step 748 the processor or associated video processing elements generates and output the image on a display for viewing by a user, or for storage for later viewing and analysis. In one embodiment, the three color channels are combined to form a color image resulting from the red, green and blue color channels.

At a step 752 the system continually receives the image of the remote scene and continually processes the incoming image as disclosed herein to generate turbulence data and generate deformable mirror control signals. This may occur dynamically in real time. This process repeats based on the detected pixel shifts in the received images. This process occurs at a frequency that is faster than the turbulence changes thereby establishing real time adaptive optic image processing.

Calculations

There are three key aspects to this invention. First the use of the variance image to enhance turbulence allows measurement of pixel shifts even when there is little high spatial frequency content allowing for correction even in high turbulence. Second, the calibration of the system that converts pixel shifts in image blocks directly to voltage or command differences to the deformable mirror and third the low computation time allowing for real time correction.

A variance image enhances the turbulent flows even with minimal image contrast and, thus, provides pixel shifts even in extremely high turbulence. Pending patent application Ser. No. 15/201,306 filed on Jul. 1, 2016 and titled Passive Method to Measure Strength of Turbulence is incorporated by reference in its entirety. This application discusses turbulence calculation. While other AO methods rely on point sources in the image giving direct access to phase measurement, long range horizontal paths do not have a point source available. Algorithms cannot correct for phase errors in the wavefront and thus cannot correct for very high turbulence errors. This invention uses a hardware solution with turbulence enhancement to do this. The index of refraction structure function is directly related to the variance over time (or space) of turbulent flows. By taking the variance over time of each pixel in an image, a variance image is formed. This method thus enhances turbulent flows and has been demonstrated to do this for both atmospheric turbulence and gas flows. Because this disclosed system has three co-aligned apertures (due to the red, green and blue filters), the pixel shifts in the variance image correspond to the phase shifts associated with the sub-aperture locations. In one implementation, pixel shifts are computed via a phase shift in the Fourier domain.

Given an intensity measurement at a focal plane at pixel location x, y, at time t, and based on proportionality to Kolmogorov's ansatz, the received flux variance (variance image) is defined as the normalized variance over all pixels on the focal plane over n samples in Δt increments as:

$$\sigma_z^2(x, y, t) = \frac{\langle I(x, y, \tau)^2 \rangle_{\tau=t_0 \text{ to } t_0+n\Delta t} - \langle I(x, y, \tau) \rangle^2_{all\, x,y\, \&\tau}}{\langle I(x, y, \tau) \rangle^2_{all\, x,y\, \&\tau}}. \quad (2)$$

In this equation, the variables x, y, and t represent the x pixel location on the detector, the y pixel location on the detector, and the time of the frame. The variable I represents radiant flux at the pixel in counts.

To extract only the turbulence information, and not the scene or sensor noise, for each row, r, or column, c, in the image, the 1-D Fourier transform is computed to obtain the 1-D power spectral density (PSD) of turbulence, φ(k). In practice, a fast Fourier transform is used to speed the calculation and reduce complexity. For horizontal calculations, k is defined as the spatial frequency in radians/pixel, and the estimated 1-D PSD for each row, r, for the Bayer red (R) channel, is computed as:

$$\phi_R(k_x, y=r, t) = \Sigma_{x=0}^{N-1} \sigma_{z\_R}^2(x, y=r, t) e^{-ik_x x/n} \quad (3)$$

This is repeated for the green (G) and blue (B) channels as shown generally in FIG. 5 above. This feature is a critical requirement for compact operation. The system computes the relative phase shift in the image in radians for red to green as:

$$\alpha_{\frac{R}{G}}(k, r, t) = \text{argMax}(FT^{-1}[\phi(k_x, y=r, t)\phi_G^*(k_x, y=g, t)]). \quad (4)$$

This process is repeated for green to blue shifts and blue to red shifts to obtain all three relative phase shifts. Because this process uses the relative phase shifts between colors, any platform motion is cancelled out, due to the entire platform moving causing each channel to experience identical movement. To obtain the horizontal pixel shifts, the relative phase shifts are multiplied by the spatial frequency such that:

$$\Delta x(r,t) = \Sigma_{k_x} a_{R/G}(k_x, r, t)/k_x \quad (5)$$

This process is repeated for all columns to get the vertical shifts.

Typical color cameras automatically demosaic imagery by converting Bayer pixel color planes (of a particular wavelength) to a single color image so the user sees only a color picture, which typically is formed from mix of the original individual color planes. The processing disclosed herein is performed on the raw Bayer pixels; therefore, the color separation remains intact, producing images directly associated with the three apertures.

As discussed earlier, the image is separated into several blocks in order to determine the relationship between the relative pixel shifts in these blocks and the required voltages or control signals presented to the deformable mirror to counter these shifts. The blocks may be superimposed over the image as shown in FIG. 6. Using a number of assumptions, based on the PSFs (point spread function) derived from the wave equation and the literature provided by Flexible Optical B.V. or other deformable mirror manufacturer, a mathematical relationship was determined between the measured R-G pixel shifts and deformable mirror deformation in z, $$(x_r(b)-x_g(b))k_{x_{fpa}} + (y_r(b)-y_g(b))k_{y_{fpa}} = 2(k(g)-k(r))(x_{DM}, y_{DM}, V)+c), \quad (6)$$

where $(x_r, y_r)$ is the pixel location for the red color plane in block b, $(x_g, y_g)$ is the pixel location for the green color plane in block b, k is the wavenumber=$2\pi c/\lambda$, z is the mirror deformation at $(x_{DM}, y_{DM})$ for voltage V, and c is a constant related to the original angle corresponding to the position of the point at the object. This calculation is performed for every block, color plane, and direction. A correction factor is required for each shift to account for the fact that the four color planes (R, G1, G2, B of the Bayer mask) are a pixel apart.

Because the pixel shifts have polarity, care is required to determine the actual delta voltages. It was determined that the relationship between delta shifts and delta voltage to be crucial. Thus, the calculated delta shifts between colors needed to be offset from delta shifts corresponding to the center voltage. To obtain the coefficients, a calibration must be done. As shown in FIG. 6, a grid pattern having 40 total blocks was established for calibration in this example. In this example embodiment, each block was 64 by 64 pixels in size in the raw color planes. Using the raw data results in half the number of pixels that result from the Bayer interpolation.

From the prototype manufacturer literature for the deformable mirror, z is proportional to $V^2$ but other deformable elements may have a different exponent. Because this quadratic is based on an approximation between electrostatic pressure and voltage, the exponent was changed to be a variable, resulting in the matrix equation $$\text{sign}(\overrightarrow{\Delta V}) \cdot |\overrightarrow{\Delta V}|^e = A \overrightarrow{\Delta p}, \tag{7}$$

where e is the exponent power between 0 and 2, initially set to 1.0, $\overrightarrow{\Delta p}$ is the relative shift as a M×1 vector where M=(# of dimensions, xy)(# of colors, clr) (# of blocks, b), A is an N×M matrix of coefficients, where N is the number of actuators positions, and $\overrightarrow{\Delta V}$ is an N×1 vector of delta voltages.

As part of calibration for this example, images were collected for 36 unique mirror actuator combinations, five different delta voltages. These actuator combinations can be different for different deformable elements. The calibration set up uses a grid pattern of point sources that match the desired image blocks and placed at the focus of an optical collimator (lab equipment). The RGB wavefront sensor is placed in front of the collimator to receive the corresponding ray bundle. The deformable mirror is commanded for each of the 36 unique mirror actuator combinations and corresponding images are saved. These images are analyzed for the relative pixel shifts corresponding to delta voltages to create vector, Δp. We then compute the solution for A (the correction matrix), with e=1 as:

$$A = (\overrightarrow{\Delta p})^{-1} (\text{sign}(\overrightarrow{\Delta V}) \cdot |\overrightarrow{\Delta V}|^e). \tag{8}$$

This correction vector is then implemented in the processor software for the RGB wavefront sensor. The implement program computes the estimated voltage error associated with the measured shifts as:

$$\widehat{\Delta V} = rA\overrightarrow{\Delta p}, \tag{9}$$

where r is a relaxation parameter between 0 and 1. Using this estimate, the updated mirror voltages are computed by the processor as:

$$V(t) = V(t-\Delta t) - (\text{sign}(\widehat{\Delta V}) \cdot |\widehat{\Delta V}|^e), \tag{10}$$

where e was equal to one for our initial test.

The hardware and calculations describe above yield a portable adaptive optics system using low-cost commercially available components. A three-color aperture configuration (RGB filter) is utilized in connection with use of temporal statistics associated with the variance image to improve the ability to get pixel shifts even in high turbulence. Integrated into the system was a deformable mirror and a suitable computing platform. In this embodiment, the fold mirror located in the telescope was replaced with the deformable mirror and an optional shroud.

FIG. 8 is a schematic of a computing or mobile device, or server, such as one of the devices described above, according to one exemplary embodiment. FIG. 8 shows an example of a computing device 870 and a mobile computing device 850, which may be used with the techniques described here. Computing device 870 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 870 includes a processor 802, memory 804, a storage device 806, a high-speed interface or controller 808 connecting to memory 804 and high-speed expansion ports 810, and a low-speed interface or controller 812 connecting to low-speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 870, including instructions stored in the memory 804 or on the storage device 806 to display graphical information for a GUI on an external input/output device, such as display 816 coupled to high-speed controller 808. In other implementations, multiple processors and/or multiple buses may be used, as appropriate, along with multiple memories and types of memory. Also, multiple computing devices 870 may be connected, with each device providing portions of the necessary operations (e.g., as a server bank, a group of blade servers, or a multi-processor system).

The memory 804 stores information within the computing device 870. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 870. In one implementation, the storage device 806 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 870, while the low-speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed bus 814. The low-speed bus 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 870 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 870 may be combined with other components in a mobile device (not shown), such as device 850. Each of such devices may contain one or more of computing device 870, 850, and an entire system may be made up of multiple computing devices 870, 850 communicating with each other.

Computing device 850 includes a processor 852, memory 864, an input/output device such as a display 854, a communication interface 866, and a transceiver 868, among other components. The device 850 may also be provided with a storage device, such as a micro-drive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or any other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850 or may also store applications or other information for device 850. Specifically, expansion memory 874 may include instructions to carry out or supplement the processes described above and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wifi, or other such transceiver (not shown). In addition, GPS (Global Positioning system) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 870 and/or 850) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An adaptive optic system for horizontal path imaging comprising:
    an optic system configured to receive an optic signal representing an image reflected from a remote scene, the optic system comprising;
        two or more color specific filters configured to filter, based on wavelength, the image reflected from the remote scene to create a first filtered optic signal of a first color and a second filtered optic signal of a second color such that the first and second filtered optic signals are represented as a ray bundle;
        one or more first optic elements configured to reduces a size of the ray bundle;
        a deformable optic element configured to:
            receive the ray bundle;
            modify the ray bundle responsive to adaptive optic control signals to create one or more adaptively adjusted optic signals;
            output the one or more adaptively adjusted optic signals from the deformable optic element;
        a second optic element configured to focus the one or more adaptively adjusted optic signals;
        a detector with associated mask filter adjacent the detector such that the mask filter includes a filter portion tuned to pass an optic signal of the first color and a filter portion tuned to pass an optic signal of the second color, the detector configured to receive the focused one or more adaptively adjusted optic signals and generate one or more digital image data sets, wherein the detector associated mask filters and the one or more filters are spectrally matched to pass an optic signal of the first color and pass an optic signal of the second color;
    a processing system configured to:
        receive and process the one or more digital image data sets to create turbulence data;
        process the one or more digital image data sets using the turbulence data to generate the adaptive optic control signals;
        provide the adaptive optic control signals to the deformable optic element, such that the deformable optic element, based on the adaptive optic control signals, removes distortion in the ray bundle representing the image;
        generate and display an image of the remote scene on a display, the displayed image improved as compared to the optic signal representing an image reflected from a remote scene that was received by the optic system.

2. The system of claim 1, wherein the optic signal is distorted due to turbulence located between the remote scene and the optic system.

3. The system of claim 1, wherein the one or more filters comprise a red filter, a green filter and a blue filter.

4. The system of claim 1, wherein the deformable optic element comprises a deformable mirror.

5. The system of claim 4, wherein modify the ray bundle responsive to adaptive optic control signals comprises adjusting the position of segments of the deformable mirror to adjust the phase of the ray bundle.

6. The system of claim 1, wherein the detector with associated mask filters comprises a Bayer mask and APS and the two or more color specific filters have a fixed aperture size.

7. The system of claim 1, wherein the one or more digital image data sets comprises a red channel data set, a green channel data set, and a blue channel data set.

8. An optic system for horizontal path imaging to compensate for turbulence in a received image from a remote scene comprising:
    two or more wavelength specific filters configured to receive and filter the received image to pass two or more filtered optic signals that are at different wavelength spectrum;
    a deformable optic element configured to modify the one or more filtered signals to counter the effects of turbulence on the image to create two or more modified signals;
    a detector, with an adjacent associated filter mask that filters the two or more specific wavelength spectrum that are matched to be the same as the two or more wavelength specific filters to pass two or more filtered modified signal, the detector configured to receive and convert the two or more modified filtered signals to image data;

a processing system configured to:
process the image data to create turbulence data;
process the image data and the turbulence data to generate the adaptive optic control signals;
provide the adaptive optic control signals to the deformable optic element, such that the modification of the one or more filtered signals by the deformable optic element is based on the adaptive optic control signals; and
generate and display an image of the remote scene have reduced turbulence distortion, on a display.

9. The system of claim 8, wherein the received image is distorted due to turbulence located between the remote scene and the optic system.

10. The system of claim 8, wherein the two or more wavelength specific filters comprise a red filter, a green filter and a blue filter.

11. The system of claim 8, wherein the deformable optic element comprises a deformable mirror.

12. The system of claim 8, further comprising an optic element between the two or more filters and the deformable optic element to direct a ray bundle from the two or more filters to the deformable optic element.

13. The system of claim 8, wherein the image data comprises a red channel data set, a green channel data set, and a blue channel data set.

14. The system of claim 8, wherein the processing the image data includes measurement of the phase of the wavefront errors without the need for a guidestar.

15. An optic system for horizontal path imaging to compensate for turbulence in an image received from a remote location comprising:
a first filter, configured to receive and filter the image received from the remote location, to only pass a first wavelength range that creates a first filtered optic signal;
a second filter, configured to receive and filter the image received from the remote location, to only pass a second wavelength range to create a second filtered optic signal, the first wavelength range being different than the second wavelength range;
a deformable optic element configured to modify the first filtered optic signal and the second filtered optic signal to counter the effects of turbulence on the image to create one or more modified signals;
detector, configured to receive and convert the one or more modified signals to image data;
a mask between the deformable optic element and the detector, the mask having at least a first mask filter configured to only pass the first wavelength range to the detector and a second mask filter configured to only pass the second wavelength range to the detector;
a processing system configured to:
process the image data to calculate turbulence between the first filter and the remote scene;
process the image data and the turbulence data to generate the adaptive optic control signals;
provide the adaptive optic control signals to the deformable optic element, such that the modification of the first filtered optic signal and the second filtered optic signal by the deformable optic element is based on the adaptive optic control signals; and
generate and display an image of the remote scene with reduced turbulence distortion on a display.

16. The system of claim 15, wherein the optic signal is distorted due to turbulence located between the remote scene and the optic system.

17. The system of claim 15, wherein the first filter comprises a red filter, the second filter comprises a green filter, and further comprising third filter comprising a blue filter.

18. The system of claim 15, wherein the first filter and the second filter are aligned in a same plane.

19. The system of claim 15, further comprising an optic element between the one or more filters and the deformable optic element to direct a ray bundle from the filter to the deformable optic element.

20. The system of claim 15, wherein the first filter and the second filter having an aperture size that does not change.

21. The system of claim 15, wherein the processing the image data includes measurement of the phase of the wavefront errors without the need for a guidestar.

* * * * *